(12) United States Patent
Lee et al.

(10) Patent No.: US 12,373,773 B2
(45) Date of Patent: Jul. 29, 2025

(54) TELECOMMUNICATIONS HARDWARE ASSET LOCATION TRACKING SYSTEMS AND METHODS

(71) Applicant: T-Mobile USA, Inc., Bellevue, WA (US)

(72) Inventors: Yun-Hong Lee, Bellevue, WA (US); David An, Bellevue, WA (US); Mario Garcia, Bellevue, WA (US); Thomas Lewis-Flood, Bellevue, WA (US); Yaqing Guo, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 589 days.

(21) Appl. No.: 17/748,967

(22) Filed: May 19, 2022

(65) Prior Publication Data

US 2023/0376888 A1 Nov. 23, 2023

(51) Int. Cl.
*G06Q 10/087* (2023.01)
*H04W 4/029* (2018.01)

(52) U.S. Cl.
CPC .......... *G06Q 10/087* (2013.01); *H04W 4/029* (2018.02)

(58) Field of Classification Search
CPC .................................................... H04W 4/029
USPC ....................................................... 455/456.1
See application file for complete search history.

(56) References Cited

U.S. PATENT DOCUMENTS

| | | | |
|---|---|---|---|
| 6,721,414 B1 | 4/2004 | Rojas et al. | |
| 7,027,808 B2 | 4/2006 | Wesby | |
| 7,062,455 B1 | 6/2006 | Tobey | |
| 7,617,210 B2 | 11/2009 | Lew et al. | |
| 7,660,731 B2 | 2/2010 | Chaddha et al. | |
| 7,664,686 B2 | 2/2010 | Czyszczewski et al. | |
| 7,685,183 B2 | 3/2010 | Pace et al. | |
| 7,747,738 B2 | 6/2010 | Ellisor | |
| 7,860,221 B2 | 12/2010 | Adkinson et al. | |
| 7,870,045 B2 | 1/2011 | Yagishita | |
| 8,266,124 B2 | 9/2012 | Thomas et al. | |
| 9,213,540 B1 | 12/2015 | Rickey et al. | |
| 9,516,044 B2 | 12/2016 | Lietz et al. | |
| 9,560,132 B1 | 1/2017 | Shanmugam et al. | |
| 9,584,509 B2 | 2/2017 | Hamburg et al. | |
| 9,665,433 B2 | 5/2017 | Grewal | |

(Continued)

FOREIGN PATENT DOCUMENTS

| | | |
|---|---|---|
| CN | 1629854 A | 6/2005 |
| CN | 101478766 A | 7/2009 |

(Continued)

*Primary Examiner* — Ahmad F. Matar
*Assistant Examiner* — Jirapon Tulop
(74) *Attorney, Agent, or Firm* — Perkins Coie LLP

(57) ABSTRACT

System and methods for managing and tracking hardware assets for a telecommunications network. A set of hardware asset records is maintained in a database table, each hardware asset record corresponding to a hardware asset of a telecommunications service provider. To update hardware asset records, a set of hardware asset objects is received from one or more operations support systems (OSSs) of the telecommunications service provider. Parameters are extracted from the hardware asset objects and compared to parameters in the hardware asset records. When a changed parameter is identified, the hardware asset record is updated to reflect the changed parameter.

20 Claims, 8 Drawing Sheets

(56) References Cited

U.S. PATENT DOCUMENTS

| | | |
|---|---|---|
| 9,786,153 B2 | 10/2017 | London |
| 9,881,267 B2 | 1/2018 | Adams et al. |
| 9,923,909 B2 | 3/2018 | Lietz et al. |
| 9,959,515 B2 | 5/2018 | Phan et al. |
| 10,013,261 B2 | 7/2018 | Krishnapura et al. |
| 10,032,131 B2 | 7/2018 | Cheng et al. |
| 10,057,644 B1 | 8/2018 | Farre Guiu et al. |
| 10,083,416 B2 | 9/2018 | Del et al. |
| 10,120,725 B2 | 11/2018 | Jubran et al. |
| 10,158,654 B2 | 12/2018 | Hamdi |
| 10,229,453 B2 | 3/2019 | Taylor et al. |
| 10,242,122 B2 | 3/2019 | Rickey |
| 10,318,955 B2 | 6/2019 | Wilczynski |
| 10,331,785 B2 | 6/2019 | Arthur et al. |
| 10,360,247 B2 | 7/2019 | Hebbalaguppe et al. |
| 10,438,414 B2 | 10/2019 | Bennett et al. |
| 10,552,900 B2 | 2/2020 | Van Vaerenbergh |
| 10,565,629 B2 | 2/2020 | Hartman |
| 10,621,551 B2 | 4/2020 | Nishimura et al. |
| 10,732,597 B2 | 8/2020 | Linscott et al. |
| 10,733,813 B2 | 8/2020 | Ide et al. |
| 10,902,381 B2 | 1/2021 | Citriniti et al. |
| 10,996,160 B2 | 5/2021 | Chalumuri et al. |
| 11,014,242 B2 | 5/2021 | Bennett et al. |
| 11,232,671 B1 | 1/2022 | Mahajan et al. |
| 11,314,678 B2 | 4/2022 | Williams et al. |
| 11,321,775 B2 | 5/2022 | Leonard et al. |
| 2005/0267927 A1 | 12/2005 | Wise et al. |
| 2007/0022106 A1 | 1/2007 | Brandt et al. |
| 2009/0070237 A1 | 3/2009 | Lew et al. |
| 2009/0259573 A1* | 10/2009 | Cheng .................. G06Q 10/087 705/28 |
| 2014/0067453 A1 | 3/2014 | Bufi et al. |
| 2015/0271639 A1* | 9/2015 | Ziskind ................. H04W 4/021 455/456.1 |
| 2017/0185949 A1 | 6/2017 | Mayhead et al. |
| 2018/0005157 A1 | 1/2018 | Narayan et al. |
| 2018/0096349 A1 | 4/2018 | Mcdonald et al. |
| 2018/0122005 A1 | 5/2018 | Hammock et al. |
| 2019/0036974 A1 | 1/2019 | O'hern et al. |
| 2019/0068437 A1 | 2/2019 | Yaacob et al. |
| 2020/0081727 A1 | 3/2020 | Ahluwalia |
| 2020/0096421 A1 | 3/2020 | Nagarathinam et al. |
| 2021/0150431 A1 | 5/2021 | Lenz et al. |
| 2021/0152446 A1 | 5/2021 | Lessmann et al. |
| 2021/0232548 A1 | 7/2021 | Isaacs |
| 2021/0312140 A1 | 10/2021 | Levkovitz et al. |
| 2022/0043936 A1 | 2/2022 | Brannon et al. |
| 2022/0107630 A1 | 4/2022 | Zope et al. |
| 2022/0108252 A1 | 4/2022 | Narasimhan et al. |
| 2022/0122044 A1 | 4/2022 | Zhuo et al. |

FOREIGN PATENT DOCUMENTS

| | | |
|---|---|---|
| CN | 103166794 A | 6/2013 |
| CN | 106022815 A | 10/2016 |
| CN | 106295926 A | 1/2017 |
| CN | 109034222 A | 12/2018 |
| CN | 111913958 A | 11/2020 |
| CN | 110401625 B | 12/2020 |
| CN | 112905288 A | 6/2021 |
| CN | 113127199 A | 7/2021 |
| CN | 112995207 B | 9/2021 |
| CN | 112039725 B | 12/2021 |
| CN | 109426505 B | 3/2022 |
| DE | 102020133663 A1 | 6/2021 |
| EP | 3259716 A1 | 12/2017 |
| EP | 3407284 A1 | 11/2018 |
| EP | 3678071 A1 | 7/2020 |
| EP | 3793166 A1 | 3/2021 |
| EP | 3875161 A1 | 9/2021 |
| JP | 2001022410 A | 1/2001 |
| JP | 2008015845 A | 1/2008 |
| JP | 2019220095 A | 12/2019 |
| JP | 2019220096 A | 12/2019 |
| KR | 20050021401 A | 3/2005 |
| KR | 20060058186 A | 5/2006 |
| KR | 102304237 B1 | 9/2021 |
| WO | 0219063 A2 | 3/2002 |
| WO | 0227426 A2 | 4/2002 |
| WO | 2005124552 A1 | 12/2005 |
| WO | 2008059254 A1 | 5/2008 |
| WO | 2008106291 A1 | 9/2008 |
| WO | 2015035957 A1 | 3/2015 |
| WO | 2015074079 A1 | 5/2015 |
| WO | 2016187382 A1 | 11/2016 |
| WO | 2017066899 A1 | 4/2017 |
| WO | 2017131603 A2 | 8/2017 |
| WO | 2018011703 A1 | 1/2018 |
| WO | 2018057469 A1 | 3/2018 |
| WO | 2018152401 A1 | 8/2018 |
| WO | 2020243818 A1 | 12/2020 |
| WO | 2021055454 A1 | 3/2021 |
| WO | 2021062242 A1 | 4/2021 |
| WO | 2021234367 A1 | 11/2021 |

\* cited by examiner

TELECOMMUNICATIONS HARDWARE ASSET LOCATION TRACKING SYSTEMS AND METHODS

BACKGROUND

Telecommunications service providers provide, use, and/or operate telecommunications networks that include various hardware assets. These hardware assets can be deployed in various configurations, such as in cell sites or base stations. Hardware assets are tracked and managed for various purposes, such as for maintaining inventories, managing hardware configurations, monitoring hardware operations, and so forth.

BRIEF DESCRIPTION OF THE DRAWINGS

Detailed descriptions of implementations of the present invention will be described and explained through the use of the accompanying drawings.

Figure 1:
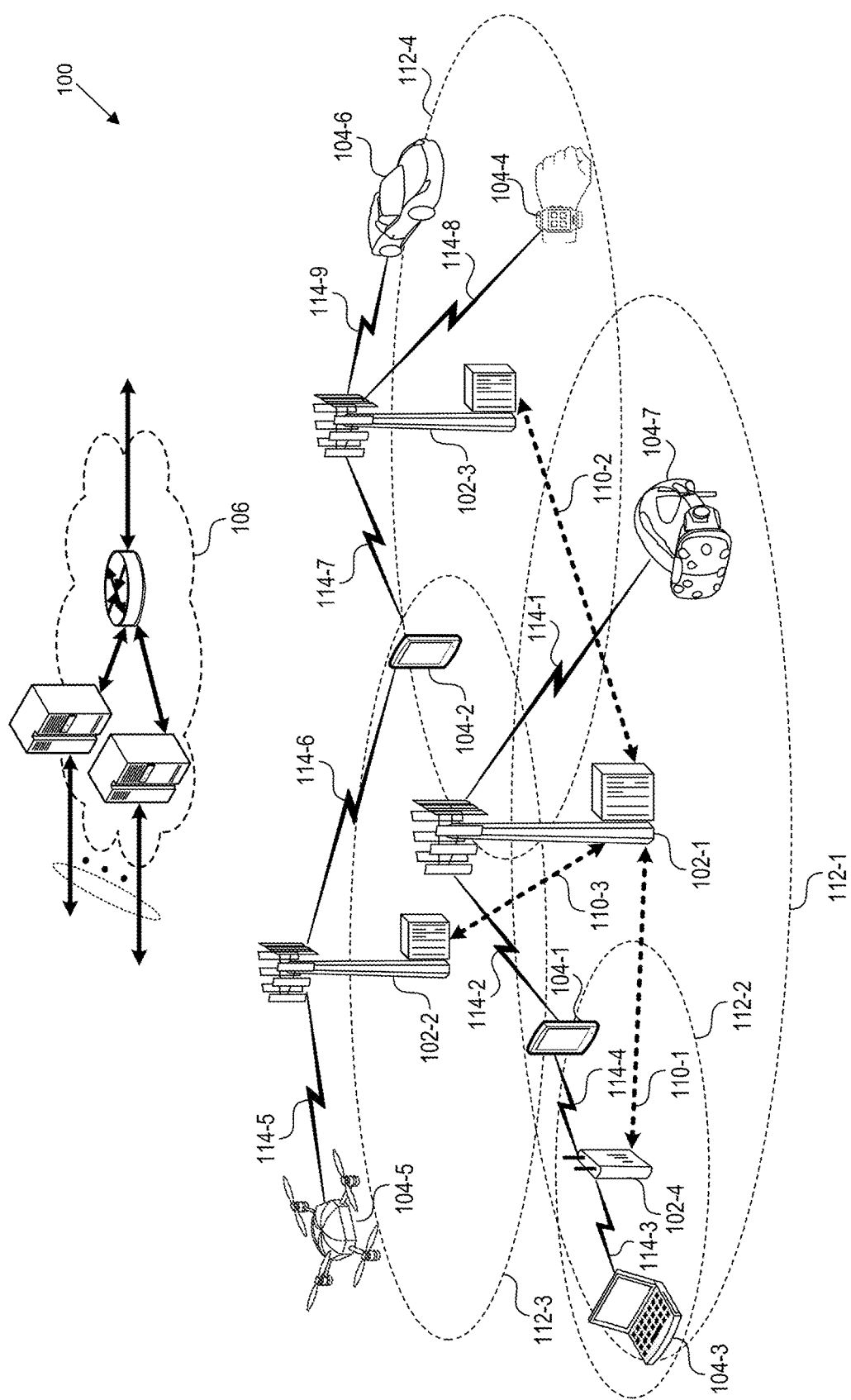
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunication service providers face difficult technical challenges related to managing and tracking hardware assets, such as tracking locations of hardware components used in cell sites or base stations. Many existing systems rely on manual processes, such as using barcodes affixed to hardware components to track locations of the hardware components. Such manual systems have many drawbacks, such as increased likelihood of errors (e.g., human error) or incomplete information. Manual systems are also time-consuming and untimely. For example, creating and/or updating a manual asset management system may require personnel to make in-person site visits to document, confirm, and/or update the presence of hardware assets at different physical locations. These manual systems and processes, thus, can also be expensive because they require additional employee time for site visits. Existing systems for managing telecommunications hardware assets also do not integrate with other systems or tools that can provide hardware asset information, such as operations support systems (OSS). For example, although individual OSSs may track location information and other information associated with hardware assets of each OSS (e.g., within different geographic regions, markets, etc.), this information is not readily available to telecommunications service providers in a way that is centralized, integrated, and/or searchable across multiple OSSs. For example, a telecommunications service provider may use many OSSs (e.g., dozens or hundreds) to track assets for a single network, and OSSs may be configured for specific subsets of hardware assets (e.g., in a certain market and/or geographic region). Additionally, OSSs are typically specific to a hardware asset vendor. For example, Nokia NetAct network management system provides limited tracking features only for Nokia hardware components, and Ericsson Network Manager (ENM) provides limited tracking features only for Ericsson hardware components. These and other shortcomings of existing systems result in a patchwork of disjointed tools for tracking and managing hardware assets, which can make it difficult to ascertain the location of a hardware asset and/or a history of a hardware asset (e.g., a location history).

Accordingly, there is a need for a technical solution that overcomes the foregoing problems and provides other benefits. For example, there is a need for a solution that can track and manage hardware assets via a centralized system that integrates with various OSSs, such as multiple OSSs provided by different vendors of hardware assets. Additionally, there is a need for a solution that provides search capability to locate hardware assets across multiple locations and/or systems, such as multiple OSSs. Furthermore, there is a need for a solution that maintains a history for hardware assets. And there is a need for a solution that allows for hardware assets to be uploaded/registered through a central portal to various OSSs.

Disclosed herein are systems and related methods for tracking and management of hardware assets associated with a telecommunications service provider ("system" or "hardware asset management system"). To determine a current location of a hardware asset, the system detects occurrence of a triggering action, such as receiving a search query and/or a scheduled update to an existing database. The system receives hardware asset objects for a set of hardware assets, each hardware asset object containing parameters characterizing a hardware asset, including a current location parameter. For at least some of the parameters in each hardware asset object, a current value is compared to a value of record (e.g., a parameter value stored in a corresponding hardware asset record in a database of the system). If a change is detected in any parameter, then the value of record is updated to be the current value. Additionally, a corresponding asset history can be updated to reflect the change in parameter value(s).

In some implementations, the hardware asset management system provides various search functions via which data and/or metadata associated with telecommunications hardware assets can be retrieved. For example, the system can enable a user to search according to sites and/or OSSs (e.g., associated with cell sites, base stations, geographic locations or regions, etc.). Additionally or alternatively, the system allows a user to search for specific hardware assets based on asset identifiers, such as a serial number or site name.

In some implementations, the hardware asset management system also provides a central portal via which hardware assets can be uploaded/registered with the system and concurrently uploaded/registered with an OSS. For example, a new hardware asset can be uploaded and added to the system directly, rather than uploading the asset via an OSS for the site where the asset is located. Uploading the asset via the hardware asset management system also causes the asset to be uploaded to the OSS.

Advantages of the disclosed system include providing a centralized system to track/manage/locate hardware assets across various systems, such as across multiple OSSs and/or physical sites. Using the disclosed system, a user can quickly search for and locate an asset (e.g., in seconds or less). Additionally, the disclosed system allows for tracking/managing/searching for hardware assets registered with various OSSs, regardless of a vendor that provides the hardware assets and/or OSSs. Furthermore, the disclosed system tracks and manages hardware assets across multiple physical sites without requiring manual processes, such as bar code scanning to document asset locations.

Although specific examples are described herein related to determining locations of hardware assets in a telecommunications network, the disclosed system can be used to determine other parameters associated with hardware assets as well. For example, the system can be used to determine version information, maintenance information, health or operational status, asset type information, and so forth. Other parameters tracked by the system can include asset identifiers (e.g., distinguished names), asset modified dates, asset vendors, cell technology (e.g., 3G, 4G, 5G), and/or OSS names (e.g., associated with assets).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
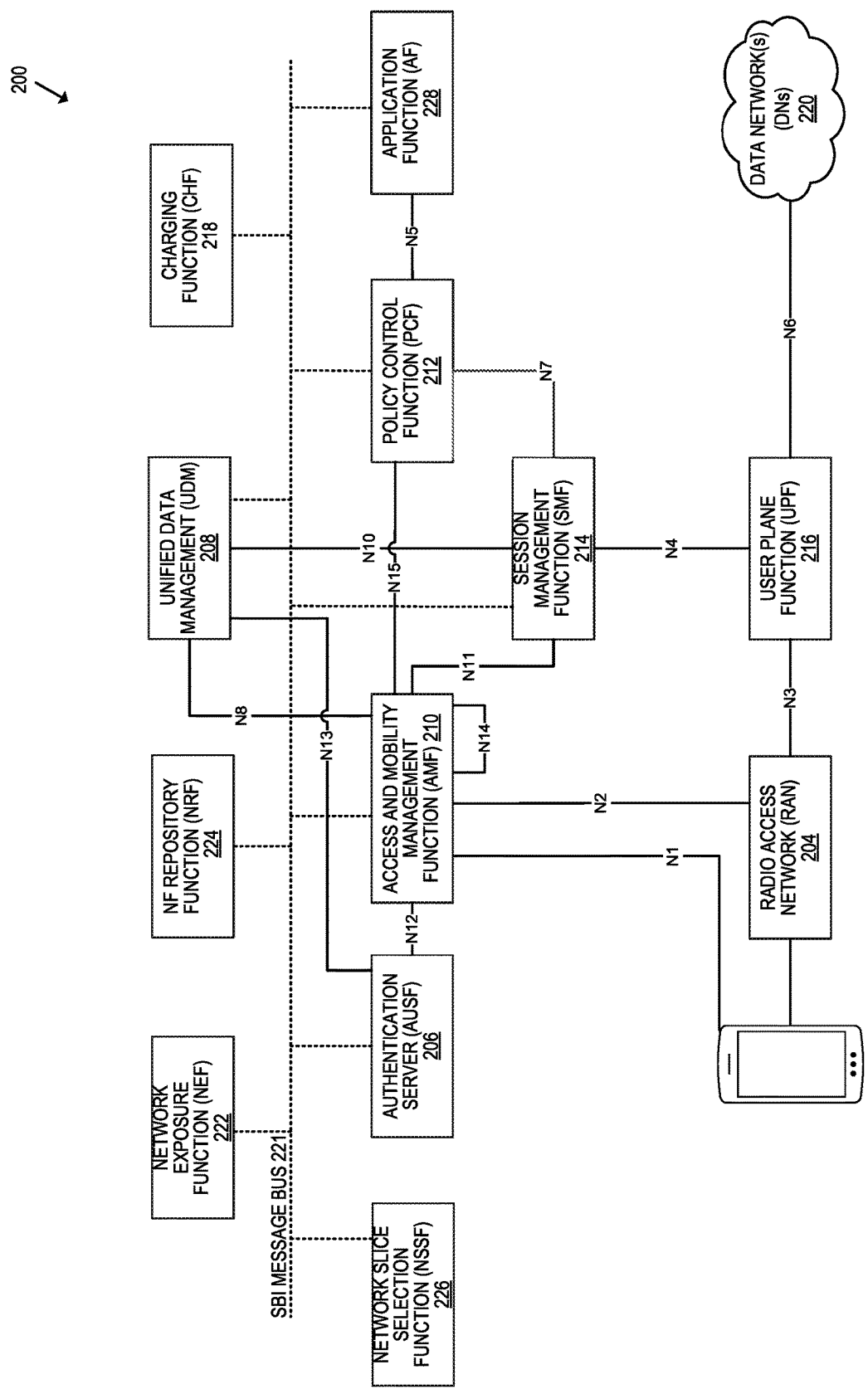
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Telecommunication Hardware Asset Management System

Figure 3:
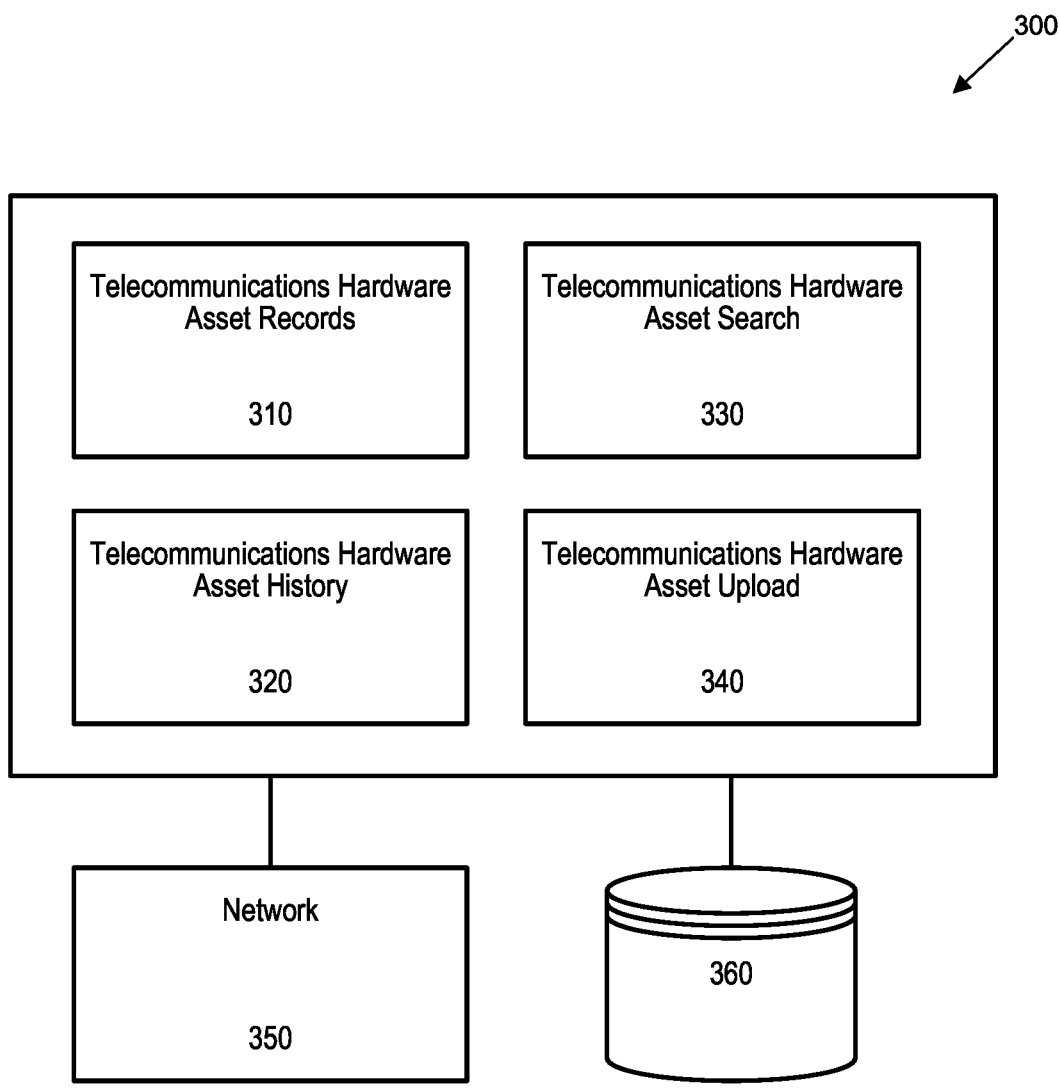
FIG. 3 is a block diagram that illustrates components of a telecommunications hardware asset management system in some implementations.

FIG. 3 is a block diagram that illustrates components of a telecommunication hardware asset management system 300 in some implementations. At least a portion of the system 300 can be provided by a telecommunications service provider that provides the network 100, and the system 300 can be used to track/manage hardware assets used in the network 100. Additionally, the system 300 can track/manage hardware assets that provide at least a portion of the architecture 200. The hardware asset management system 300 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The hardware asset management system 300 includes a telecommunications hardware asset records module 310, a telecommunications hardware asset history module 320, a telecommunications hardware asset search module 330, and/or a telecommunications hardware asset upload module 340, each of which are discussed separately below. Additionally, the hardware asset management system 300 includes a network component 350 via which the system 300 can communicate with external systems, entities, devices, and so forth. For example, the system 300 can use the network component 350 to receive hardware asset objects (e.g., from an operations support system (OSS)) and/or to receive and respond to search queries. The hardware asset management system 300 also includes a storage component 360 comprising local storage, storage on a server system or on the cloud, or a combination thereof. The storage component 360 stores data for and/or used by the system 300, such as data related to hardware assets of a telecommunications service provider (e.g., hardware asset objects, hardware asset records, etc.).

Telecommunications Hardware Asset Records Module

The telecommunications hardware asset records module 310 generates and/or maintains records characterizing telecommunications hardware assets of a telecommunications service provider. The records can be generated and/or maintained in one or more tables, which can be stored in one or more databases. Each record can include various data and/or metadata characterizing a telecommunications hardware asset, such as an identifier (e.g., serial number and/or name), a location (e.g., a cell site or base station, a geographic location, etc.), an operations support system (OSS) associated with the hardware asset, a hardware type or hardware type identifier, a hardware version, a hardware vendor, a technology description, and/or a distinguished name. A hardware type identifier can include an adaptation ID, such as an identifier that can be used to retrieve different hardware types via an API call to an OSS. The telecommunications hardware asset records module 310 provides an up-to-date record of telecommunications hardware assets used by a telecommunications service provider. As described herein, the telecommunications hardware assets are tracked and/or managed without the use of manual processes for documenting locations of the assets, such as documenting hardware assets via physical site visits and/or using bar code scanners. For example, telecommunications hardware asset records generated/stored by the module 310 can instead be based on data received/accessed from one or more OSSs. Other data or metadata included in a telecommunications hardware asset record can include timestamps (e.g., last modified date/time, last accessed date/time), counts (e.g., number of record modifications), relationships to other records (e.g., historical telecommunications hardware asset records), and so forth.

In some implementations, telecommunications hardware asset records generated/maintained by the module 310 are in a standardized format, regardless of a data format received from an OSS. For example, the system 300 can receive telecommunications asset data objects from OSSs, regardless of a vendor that provides a hardware asset and/or a corresponding OSS, and convert data from the data objects to a standardized format. In some implementations, each telecommunications hardware asset record can include a distinguished name for a corresponding telecommunications hardware asset record, which can indicate one or more relationships between the telecommunications hardware asset and other assets, other systems, locations, OSSs, and so forth. For example, a distinguished name can be an identifier (e.g., a string) by which a telecommunications hardware asset is identifier in relation to a particular location within a network (e.g., from broad to narrow scope/location), which may be indicated as follows: network>subnetwork>site>chassis>slot>asset. Thus, in some implementations, the distinguished name can change based on changes to the corresponding telecommunications hardware asset, such as when the asset is moved to another location (e.g., a different slot, chassis, or site), cell site, base station, and so forth.

To generate telecommunications hardware asset records, the telecommunications hardware asset records module 310 receives telecommunications hardware asset objects from one or more OSSs with which hardware assets are registered. Telecommunications hardware asset objects are a kind of data object generated by OSSs each representing a hardware asset registered with the OSS, such as a hardware asset included in a cell site, base station, or other configuration of hardware assets represented in the OSS. Each OSS can be specific to a vendor that provides the hardware assets. Additionally or alternatively, each OSS can be specific to a subset of hardware assets included in a telecommunications network, such as a particular geographic market or region. The hardware asset objects can be received via one or more application programming interfaces (APIs). The hardware asset objects can be received periodically (e.g., hourly, daily, weekly, etc.) and/or in response to one or more triggering events or actions, such as in response to receiving a search query (e.g., via the telecommunications hardware asset search module 330). Each received hardware asset object includes various data and/or parameters associated with a current status of a hardware asset used by the telecommunications service provider, including at least an identifier (e.g., serial number and/or name), a location (e.g., a cell site or base station, a geographic location, etc.), a hardware type, a hardware version, a hardware vendor, a technology description, and/or a distinguished name. The hardware asset objects may be in various formats, for example, because different hardware vendors and/or OSS providers may represent hardware assets in different ways. Thus, the telecommunications hardware asset records module 310 converts data in the received hardware asset objects into a standardized format to be stored in a telecommunications hardware asset record.

To generate and/or update hardware records, the telecommunications hardware asset records module 310 determines whether a record exists for each hardware asset reflected in the received telecommunications hardware asset objects, such as by determining a match between serial numbers or other identifiers of each hardware asset. If a match is determined between a hardware asset object and a hardware asset record, the telecommunications hardware asset records module 310 determines whether any asset parameters have changed by comparing data in the hardware asset record and the hardware asset object, respectively. If there is a difference in any parameter for a same asset, then the parameter in the hardware asset object prevails, and the corresponding hardware asset record is updated to reflect the changed parameter. For example, a new hardware asset record can be generated and stored in the table and/or database of hardware asset records, and the old hardware asset record can be moved to a table and/or database of historical hardware asset records. If there is no difference in any parameter for a same asset, then the corresponding hardware asset record is retained without modifications in the table and/or database of hardware asset records. If no match is determined between a hardware asset object and a hardware asset record (e.g., because the hardware asset object represents a new hardware asset), then a new hardware asset record is generated for the hardware asset and stored in the table and/or database of hardware asset records.

Telecommunications Hardware Asset History Module

The telecommunications hardware asset history module 320 maintains historical records related to telecommunications hardware assets of a telecommunications service provider. For example, the telecommunications hardware asset history module 320 can include one or more tables and/or databases containing historical telecommunications hardware asset records corresponding to current telecommunications hardware asset records generated/maintained by the telecommunications hardware asset records module 310. As described herein above, when the system 300 determines a match between a same telecommunications hardware asset associated with a telecommunications hardware asset object (e.g., received from an OSS) and associated with a telecommunications hardware record (e.g., maintained by the telecommunications hardware asset records module 310), the system 300 can determine a change in one or more parameters for the same telecommunications hardware asset (e.g., a changed location, cell site, base station, OSS, etc.). Because the telecommunications hardware asset object reflects a current status of the telecommunications hardware asset, the changed parameter from the hardware asset object will be used to update a corresponding telecommunications hardware asset record (e.g., by generating a new record), and the previous version of the telecommunications hardware asset record is then stored in the telecommunications hardware asset history module 320 as part of a history of the telecommunications hardware asset. The archived record can further include additional information, such as a time stamp indicating a date and/or time when the record was archived.

In some implementations, the hardware asset history module 320 tracks a status of each telecommunications hardware asset. The statuses tracked by the module 320 can include a "New" status (i.e., an asset not yet represented in the system), a "Moved" status (i.e., an existing asset has been moved to a different location and/or OSS), an "Updated" status (i.e., an a existing asset that has been updated), and/or a "Removed" status (i.e., an asset that is no longer present). In response to determining that an asset is "new," the asset can be added to a data structure (e.g., a table and/or database) of active hardware assets, such as by generating a telecommunications hardware asset record. In response to determining that an asset is "moved," the location of the asset is updated, a status of the asset is updated, and the previous version of the telecommunications hardware asset record is added to the history for the asset. In response to determining that an asset is "updated," a status of the asset is updated and the previous version of the telecommunications hardware asset record is added to the history for the asset. In response to determining that the asset is "removed," the asset is removed from a table and/or database of active hardware assets and added to a database of historical hardware assets with a status of "removed."

Telecommunications Hardware Asset Search Module

The telecommunications hardware asset search module 330 provides search capabilities to find data and/or metadata associated with telecommunications hardware assets, such as data and/or metadata maintained by the telecommunications hardware asset records module 310 and/or the telecommunications hardware asset history module 320. Current and historical records can be searched using various parameters, including one or more sites or locations (e.g., cell sites or base stations) where hardware assets are deployed and/or hardware asset identifiers (e.g., serial numbers, asset names, etc.). To provide search capabilities, the telecommunications hardware asset search module 330 provides one or more search interfaces, such as the interface 500 of FIG. 5A. The telecommunications hardware asset search module 330 receives queries, such as in the form of character strings, and retrieves one or more telecommunications hardware asset records in response to the queries. For example, the module 330 can receive a query for a specific hardware asset identified using a serial number or other identifier. In response to this query, the module 330 retrieves a corresponding hardware asset record for the hardware asset. Additionally or alternatively, the module 330 receives a query for a location or site, such as a cell site or base station, which includes an identifier (e.g., a name) for the location or site and/or an OSS with which the site is registered. In response to the query, the module 330 retrieves hardware asset records for all hardware assets deployed at the specified location or site. In these and other implementations, the module 330 can additionally or alternatively retrieve historical records for hardware assets identified in response to a search query.

Telecommunications Hardware Asset Upload Module

The telecommunications hardware asset upload module 340 allows a user to upload/register a hardware asset, such as a new hardware asset, as an alternative to registering/uploading the hardware asset via an OSS. When a hardware asset is uploaded via the module 340, data associated with the hardware asset becomes available via the system 300 immediately. For example, a telecommunications hardware asset record for the asset is generated and stored by the telecommunications hardware asset records module 310. Additionally, data associated with the hardware asset can be searched using the telecommunications hardware asset search module 330. Furthermore, assets upload via the telecommunications hardware asset upload module 340 are also registered with the OSS associated with the location or site where the hardware asset is located. To register or upload a hardware asset, the telecommunications hardware asset upload module 340 can use one or more interfaces, such as the interface 500 of FIG. 5A. The module 340 receives parameters associated with the hardware asset, including an identifier (e.g., a serial number) and an OSS. In response to receiving the parameters, the module 340 causes the hardware asset to be uploaded to the system 300, and a new hardware asset record is generated.

In general, the telecommunications hardware asset upload module 340 synchronizes actual asset data from sites with corresponding OSSs for the sites. The module 340 receives an input including a site name and runs a synchronization command to retrieve all hardware information from the corresponding site(s) to update the OSS. The hardware information can be retrieved using a database query. In some implementations, the telecommunications hardware asset upload module 340 provides a bulk upload feature whereby multiple assets can be uploaded at one time (e.g., dozens or hundreds).

Updating Telecommunication Hardware Asset Records

Figure 4:
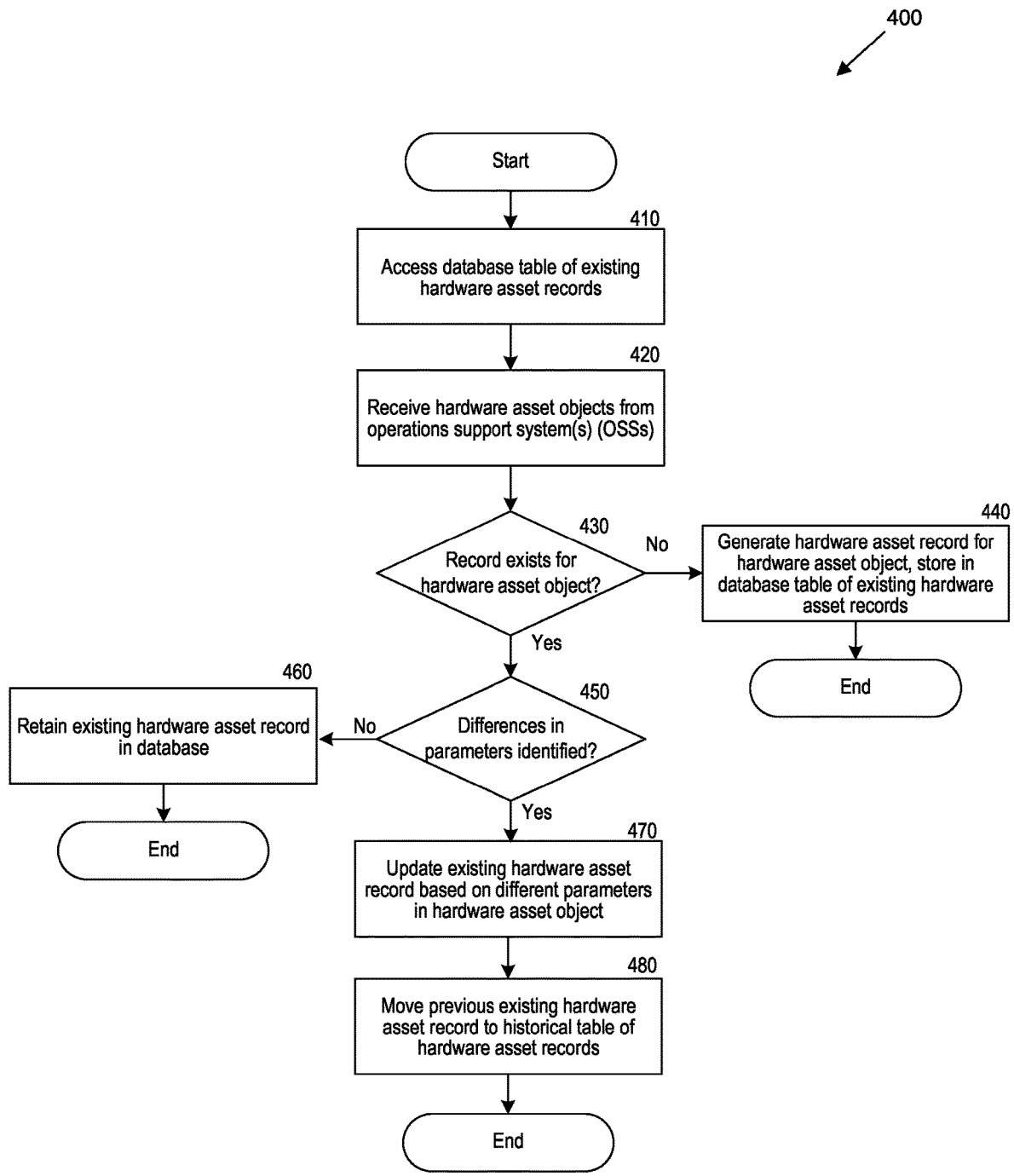
FIG. 4 is a flow diagram that illustrates a process to update a database table of existing hardware asset records in some implementations.

FIG. 4 is a flow diagram that illustrates a process 400 to update existing hardware asset records in some implementations. At least a portion of the process 400 can be performed by the system 300 of FIG. 3, such as by the telecommunications hardware asset records module 310 and/or the telecommunications hardware asset history module 320.

The process 400 begins at block 410, where one or more database tables are accessed, which contain a set of hardware asset records for various hardware assets of a telecommunications service provider. Each hardware asset record includes parameters characterizing a hardware asset, including an identifier (e.g., name, distinguished name, or serial number), a location or site where the asset is located, hardware version information, and/or an OSS associated with the hardware asset. Each record can also include, for example, technology information (e.g., 3G, 4G, 5G), hardware type, vendor, and/or OSS. The hardware asset records reflect a current set of hardware assets that are tracked/managed using the disclosed system.

The process 400 proceeds to block 420, where a set of telecommunications hardware asset objects is received from one or more operations support systems (OSSs) of the telecommunications service provider. As described herein, the hardware asset objects are data objects representing hardware assets currently deployed by the telecommunications service provider, and the hardware asset objects contain various data and/or metadata associated with the hardware asset objects, including an identifier (e.g., name or serial number), a location or site (e.g., cell site or base station). The hardware asset records can be received via an API and in response to an API call (e.g., via an API provided by or for an OSS). The API call can create a HTTPS GET request using a hardware asset object path, a hardware type, a version, and/or technology information, then send it to the OSS. The OSS then queries the database, retrieves the requested hardware assets, and sends them back to the disclosed system. Retrieving the hardware asset records can be performed periodically (e.g., hourly, daily, weekly, etc.) and/or in response to one or more triggering actions. For example, an API call can be generated to retrieve all current hardware asset objects in real time and in response to receiving a search query to locate a hardware asset.

The process 400 then proceeds to decision block 430, where each hardware asset object received at block 420 is analyzed to determine whether a corresponding hardware asset record exists. That is, at block 430, it is determined whether each asset represented in the hardware asset objects is already represented in the hardware asset records. Thus, at block 430, identifiers (e.g., serial numbers or names) of the assets can be compared between the hardware asset objects and the hardware asset records to determine whether there is a match.

For a particular hardware asset represented in the hardware asset objects, if no corresponding hardware asset record is found, then the process 400 proceeds to block 440, where a hardware asset record is generated for the hardware asset and stored in the database table of existing hardware asset records.

If a match is determined between a same hardware asset that is represented in both the hardware asset objects received at block 420 and the hardware asset records accessed at block 410, then the process 400 proceeds to decision block 450, where data in the hardware asset object is compared to data in the hardware asset record for the same hardware asset.

Based on the comparison at block 450, if no change in parameters is identified, then the process 400 proceeds to block 460, where the existing record for the same hardware asset is retained with no changes in the database table of existing hardware asset records.

If, at block 450, one or more changed parameters are identified, then the process 400 proceeds to block 470, where a corresponding hardware asset record for the same hardware asset is updated to reflect the one or more changed parameters reflected in the hardware asset object for the same hardware asset. Updating the hardware asset record can include, for example, generating a new hardware asset record and storing the new hardware asset record in the database table of existing hardware asset records.

The process 400 then proceeds to block 480, where the previous version of the hardware asset record for the same hardware asset is moved to a database table of historical hardware asset records.

All or portions of the process 400 can be performed in any order, including performing one or more operations in parallel. Additionally, operations can be added to or omitted from the process 400 without deviating from the teachings of the present disclosure. For example, it is contemplated that operations at blocks 440, 460, 470, and/or 480 can be repeated for multiple hardware assets as each hardware asset object received at block 420 is analyzed to determine whether a corresponding asset is already represented in the hardware asset records access at block 410, and as it is determined whether any parameters have changed.

Search Interface for Telecommunication Hardware Assets

Figure 5A:
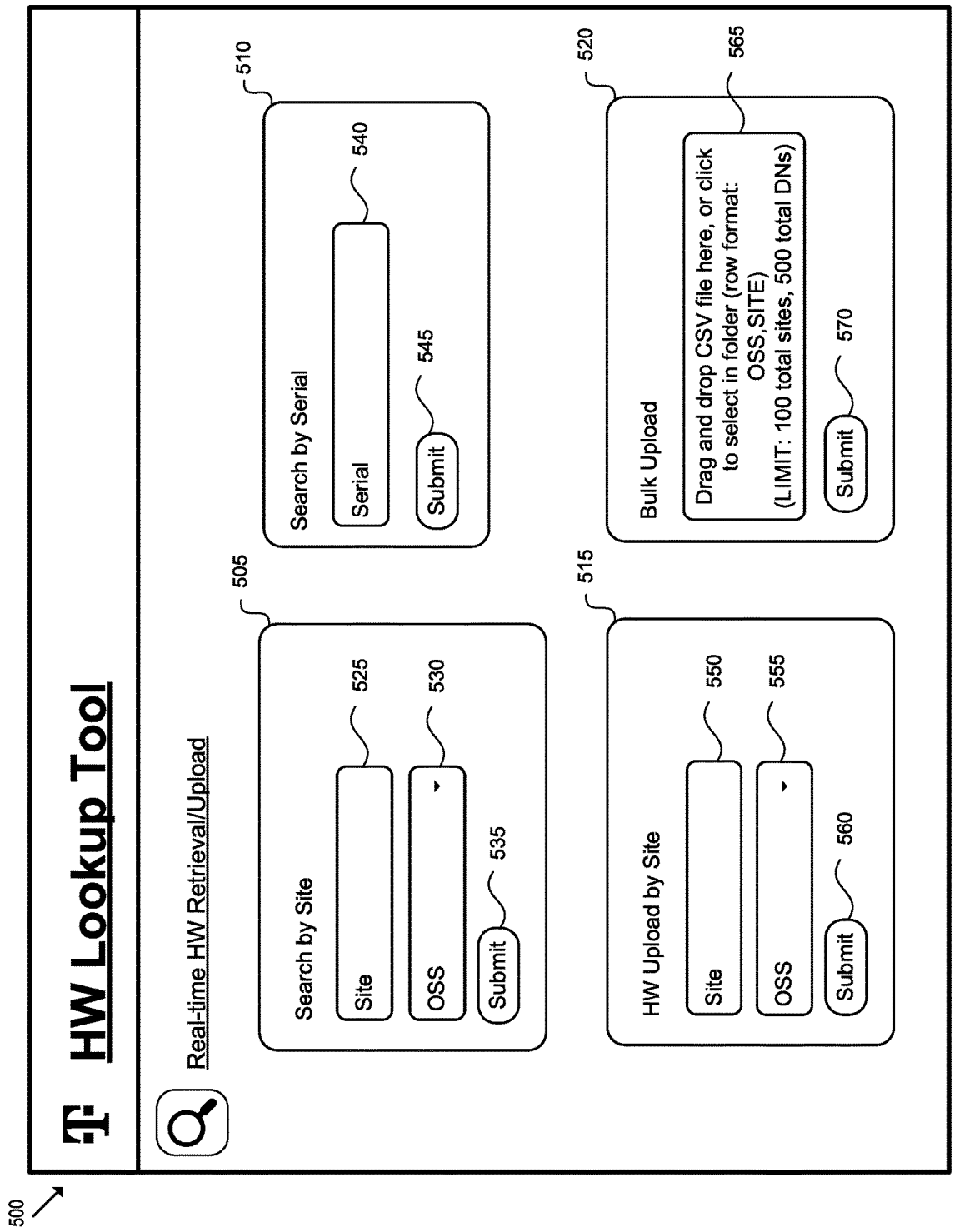
FIG. 5A is a display diagram that illustrates an interface for searching for telecommunications hardware assets in some implementations.

FIG. 5A is a display diagram that illustrates an interface 500 provided by the system to search for and/or upload telecommunication hardware assets in some implementations. The interface 500 can be provided by and/or used by the system 300, such as by the telecommunications hardware asset search module 330 and/or the telecommunications hardware asset upload module 340. The interface 500 includes a "search by site" region 505, a "search by serial" region 510, a "hardware upload by site" region 515, and/or a "bulk upload" region 520.

To search for hardware assets associated with a particular site (e.g., a cell site or base station), the "search by site" region includes a search field 525 and an OSS field 530. In the search field 525, one or more search terms can be received, such as character strings containing identifiers for sites (e.g., site names). Additionally or alternatively, a selection of one or more OSSs associated with a site can be selected using the OSS field 530, which provides a dropdown menu (not shown) from which the one or more OSSs can be selected. When inputs have been provided in the fields 525 and/or 530, a selection of the submit button 535 is received, and a search is then performed to locate one or more sites corresponding to the inputs. If one or more sites are identified, then the interface 500 and/or a different interface can display all hardware asset records associated with the identified site(s). For example, data associated with each asset can be displayed, including an OSS, a site, an asset identifier (e.g., serial number), a technology or technology type, distinguished name, a vendor, a version, and/or a last modified data.

To search by a serial number or other hardware asset identifier, the "search by serial" region 510 includes a search field 540. One or more search terms can be received via the search field 540, such as character strings containing identifiers for one or more hardware assets (e.g., serial number and/or name). When one or more inputs have been provided in the search field 540, a selection of the submit button 545 is received, and a search is performed to locate any hardware asset records associated with a received hardware asset identifier. If one or more assets are identified, then the interface 500 and/or a different interface can display a hardware asset record associated with the identified hardware asset(s).

The search output displays current active hardware asset information with its current location, DN, OSS name, technology, updated time, and/or site name. If the hardware asset has been updated, moved, or removed, then the history of the asset will be displayed under the current active hardware asset info, including all previous locations along with all other hardware info.

To upload hardware assets for a site, the "hardware upload by site" region 515 includes an input field 550 and/or an OSS field 555. One or more site identifiers can be received, via the input field 550, for a site (e.g., a cell site or base station) where assets are being uploaded. The one or more site identifiers can be, for example, a site name. Additionally, the OSS field 555 can provide a dropdown menu (not shown) where one or more OSSs can be selected to which the asset will be uploaded. When one or more inputs have been provided via the fields 550 and 555, a selection of the submit button 560 is received, which causes the asset to be uploaded to the site specified in the input field 550 and/or to an OSS specified via the OSS field 555. Additionally or alternatively, one or more other interfaces can be displayed via which additional information can be received about an uploaded asset. A telecommunications hardware asset record can be generated and stored by the system to begin tracking and/or managing the hardware asset.

In general, uploading assets includes synchronizing assets from sites with corresponding OSSs for the sites. In response to receiving a selection of the submit button 560, a sync command is generated to retrieve all hardware information from the specified site to update the specified OSS. The hardware information can be retrieved using a database query.

The "bulk upload" region 520 allows for multiple hardware assets to be uploaded at the same time. For example, multiple sites and OSSs to which hardware assets are to be uploaded can be specified in a delimited file, such as a comma-separated values (CSV) file. Each row within the delimited file can specify a respective OSS and site where a hardware asset is to be uploaded. The delimited file can be received via the "bulk upload" region 520, for example, by dragging and dropping to a target drop region 565 or by specifying a folder location where the delimited file can be accessed. In response to receiving the delimited file, a database query is generated for each pairing of a site and an OSS. The database query is to retrieve hardware asset data for each specified site, which is used to update the corresponding OSS.

Searching for Telecommunication Hardware Assets

Figure 5B:
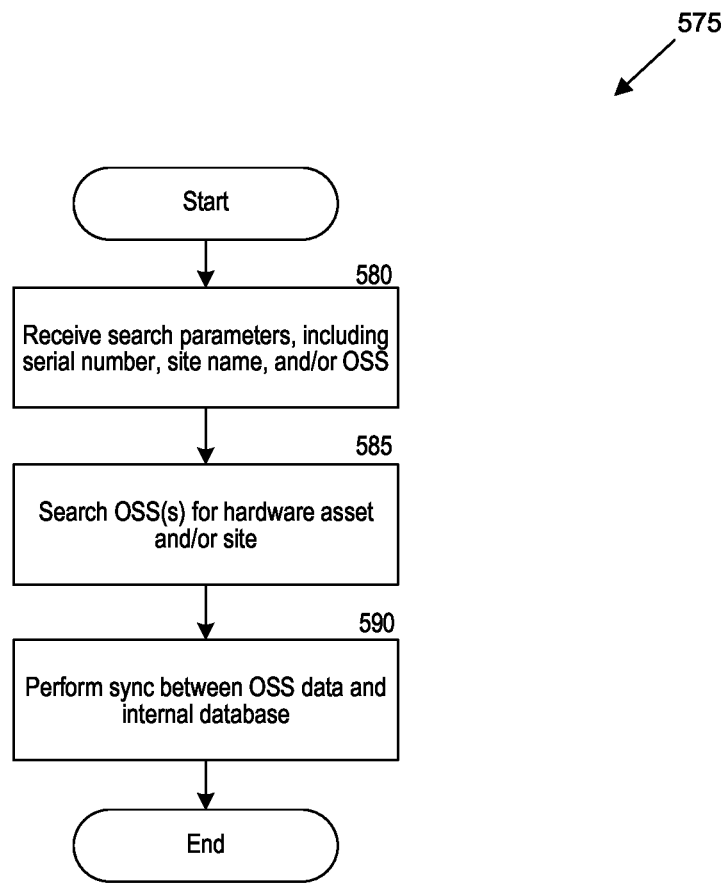
FIG. 5B is a flow diagram that illustrates a process to search for telecommunications hardware assets in some implementations.

FIG. 5B is a flow diagram that illustrates a process 575 to search for telecommunication hardware assets and/or sites in some implementations. At least a portion of the process 575 can be performed by the system 300 of FIG. 3, such as by the telecommunications hardware asset search module 330. Additionally or alternatively, the process 575 can be performed using one or more interfaces, such as the interface 500 of FIG. 5A.

The process 575 begins at block 580, where one or more search parameters are received. A search parameter can be an identifier (e.g., serial number and/or name) for a telecommunications hardware asset. Additionally or alternatively, search parameters can be a site identifier (e.g., site name) and/or an OSS associated with a site. The search parameters can be received via one or more interfaces, such as the interface 500 of FIG. 5A.

The process 575 proceeds to block 585, where a search is performed using the search parameters received at block 580. Performing the search can be based on various available search technologies, such as using indexing and/or structured queries. The search can be performed in one or more OSSs, which may provide APIs via which data related to hardware assets can be received. Additionally or alternatively, the search can be performed in one or more internal databases maintained by the hardware asset management system. In some implementations, the search is performed in an OSS and the search results are used to update/synchronize the one or more internal databases maintained by the system. Search results can be returned in various formats, such as via a graphical user interface that displays one or more telecommunications hardware asset records.

The process 575 proceeds to block 590, where a sync is performed between telecommunications hardware asset object data received from an OSS and telecommunications hardware asset records contained in an internal database. For example, performing a sync can include performing at least a portion of process 400 of FIG. 4.

Computing System

Figure 6:
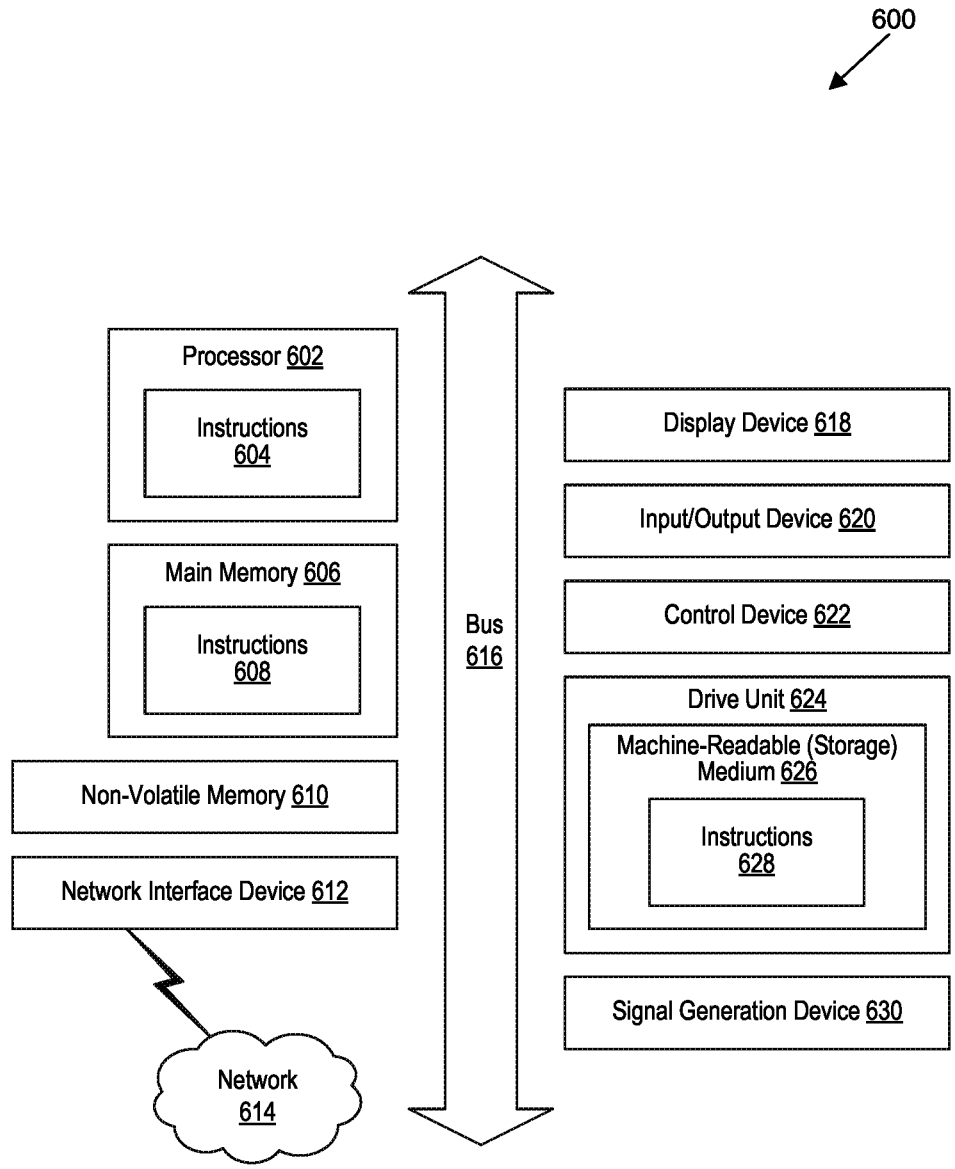
FIG. 6 is a block diagram that illustrates an example of a computing system in which at least some operations described herein can be implemented.

FIG. 6 is a block diagram that illustrates an example of a computing system 600 in which at least some operations described herein can be implemented. As shown, the computing system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computing system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computing systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Determining Current Parameter Values of a Hardware Asset

Figure 7:
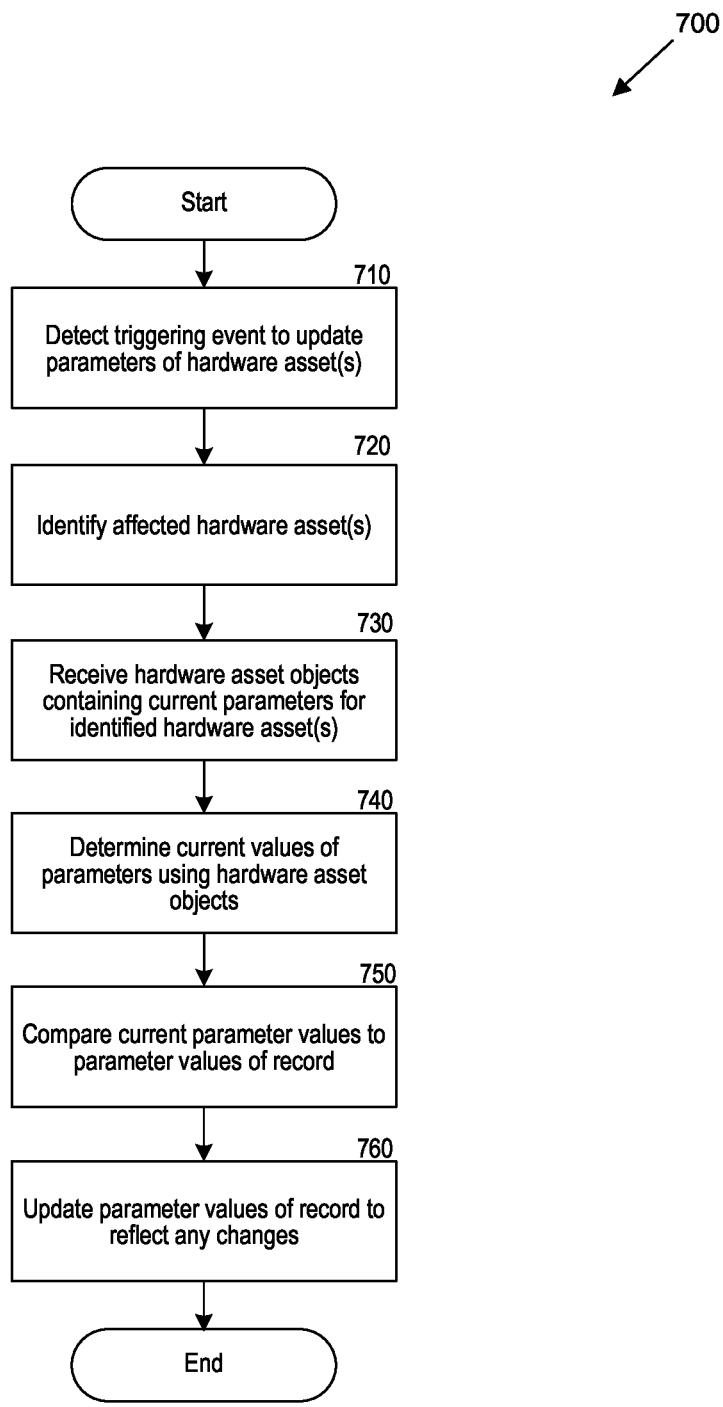
FIG. 7 is a flow diagram that illustrates a process for determining current parameters for a hardware asset in some implementations.

FIG. 7 is a flow diagram that illustrates a process 700 for determining current parameters for a hardware asset in some implementations. At least a portion of the process 700 can be performed by the system 300 of FIG. 3, such as using the telecommunications hardware asset records module 310 and/or the telecommunications hardware asset history module 320. The process 700 can be used to determine one or more current parameter values for a hardware asset within a telecommunications network, such as to determine a current location and/or to update an asset history for a hardware asset based on any changes in parameters.

The process 700 begins at block 710, where one or more triggering events are detected related to one or more hardware assets. The triggering events cause performance of operations to determine current parameter values for a hardware asset and/or a set of hardware assets. A triggering event can be, for example, receiving a search query to locate a hardware asset and/or a search query to determine one or more other parameters for the hardware asset. Additionally or alternatively, the triggering event can be a scheduled update for a database or other data structure containing status information or other parameters associated with hardware assets. The triggering event can also include receiving a request to upload a telecommunications hardware asset.

The process 700 proceeds to block 720, where one or more hardware assets are identified based on the triggering event received at block 710. For example, only a single hardware asset can be identified (e.g., in response to a search query for information about the hardware asset). Additionally or alternatively, all hardware assets of a telecommunications service provider can be identified. Additionally or alternatively, a subset of hardware assets can be identified, such as all assets within a base station, cell site, geographic area, and/or reflected in one or more OSSs. In some implementations, a subset of hardware assets is identified based on attributes of the triggering event, such as search terms in a query.

The process 700 proceeds to block 730, where hardware asset objects are accessed/received/retrieved for the one or more hardware assets identified at block 720. In some implementations, a hardware asset object is accessed for each hardware asset in an identified subset of hardware objects. The hardware asset objects contain current values for parameters and/or status information associated with the one or more hardware asset objects. For example, the hardware asset objects can contain current location information, version information, hardware asset type information, hardware asset identifiers, asset health information, asset maintenance information, battery life, and so forth. In some implementations, the hardware asset objects contain vendor information, production data information, floor information or other physical location information, and/or vendor support information.

The process 700 then proceeds to block 740, where current values for at least some of the parameters are identified. For example, the current values can be extracted from one or more fields in the hardware asset objects accessed at block 730.

The process 700 then proceeds to block 750, where the current values determined at block 740 are compared to corresponding parameter values of record (e.g., most recent parameter values in a local database). The values of record can be included, for example, in one or more hardware asset records stored in one or more database tables, as described with respect to process 400 of FIG. 4. For example, a current value for an asset location reflected in a hardware asset object can be compared to a most recent location reflected in a hardware asset record for the same hardware asset (e.g., stored in a database).

The process 700 proceeds to block 760, where a value of record for any changed parameter can be updated based on the current parameter value determined at block 740. Updating the value of record can include, for example, generating a new hardware asset record and storing the new hardware asset record in a database and/or table. Additionally or alternatively, an asset history for the hardware asset can be updated based on any changes in parameters and/or a status of the asset can be updated in one or more databases (e.g., "new," "moved," "removed," and/or "updated"). Updating the asset history can include, for example, moving a database record to a different database of historical asset records and/or recording a modified time for the asset. The asset history can be tracked and/or updated on a per-serial number basis. In some implementations, an asset history for a removed/decommissioned asset will be removed or discarded after a threshold period of time (e.g., weeks, months, years). In these and other implementations, a removed and/or decommissioned asset will not be removed immediately, for example, to avoid removing an asset that is only temporarily removed for repairs.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system to determine a location of a telecommunications hardware asset in a telecommunications network, the system comprising:
    at least one hardware processor; and
    at least one non-transitory memory carrying instructions that, when executed by the at least one hardware processor, cause the system to perform operations comprising:
        detecting a triggering event to update parameter values associated with a set of telecommunications hardware assets;
        using attributes of the triggering event, selecting a subset of telecommunications from the set hardware assets telecommunications hardware assets,
            wherein the subset of telecommunications hardware assets includes a first telecommunications hardware asset and a second telecommunications hardware asset; and
        for each telecommunications hardware asset in the subset of telecommunications hardware assets:
            accessing a first telecommunications hardware asset object associated with the first telecommunications hardware asset from a first operations support system (OSS);
            accessing a second telecommunications hardware asset object associated with the second telecommunications hardware asset object from a second OSS;
            determining, using the accessed at least one telecommunications hardware asset object, a current value of a location parameter of the telecommunications hardware asset;
            determining a value of record of the location parameter of the telecommunications hardware asset; and
            when the value of record of the location parameter does not match the current value of the location parameter of the telecommunications hardware asset, updating the value of record to be the current value of the location parameter.

2. The system of claim 1, wherein the triggering event includes receiving a search query associated with the at least one telecommunications hardware asset, and wherein at least a portion of the operations are performed in real time in response to the triggering event.

3. The system of claim 1, wherein the triggering event includes a scheduled database update, and wherein the current value of the location parameter of at least one telecommunications hardware asset in the subset of telecommunications hardware assets corresponds to a cell site or base station.

4. The system of claim 1, wherein determining the value of record includes accessing a telecommunications hardware asset record in a database, and wherein updating the value of record includes generating a new telecommunications hardware asset record.

5. The system of claim 1, wherein the operations further comprise:
    before updating the value of record, storing the value of record in an asset history for the telecommunications hardware asset.

6. The system of claim 1, wherein the operations further comprise:
    updating at least one other value of record for a telecommunications hardware asset in the subset of telecommunications hardware asset based on a telecommunications hardware asset object,
        wherein the at least one other value of record is associated with an asset version, an OSS, an asset health, a battery life, a scheduled maintenance time, an asset configuration, or an asset type.

7. At least one computer-readable medium, excluding transitory signals, carrying instructions that, when executed by a computing system, cause the computing system to perform operations to update an asset history for a telecommunications hardware asset, the operations comprising:
    detecting a triggering event associated with at least one hardware asset in a telecommunications network of a telecommunications service provider;
    identifying a set of parameters characterizing the at least one hardware asset including a current location of the at least one hardware asset within the telecommunications network,
        wherein the at least one hardware asset includes a first hardware asset and a second hardware asset, and
        wherein the set of parameters is retrieved, via an application programming interface (API), from a first data object associated with the first hardware asset from a first operations support system (OSS) and a second data object associated with the second hardware asset from a second OSS;
    comparing the current location of the at least one hardware asset to a location of record for the at least one hardware asset,
        wherein the location of record for the at least one hardware asset is retrieved from a data structure containing status information associated with the at least one hardware asset; and
    when a change in location is identified based on comparison of the current location to the location of record, updating the location of record by:
        updating an asset history associated with the at least one hardware asset to indicate the location of record as a historic location of the at least one hardware asset; and
        after the asset history has been updated, updating the location of record to be the current location.

8. The at least one computer-readable medium of claim 7, wherein the triggering event includes a scheduled database update or receiving a search query associated with the at least one hardware asset.

9. The at least one computer-readable medium of claim 7, wherein the current location includes a cell site or base station within the telecommunications network.

10. The at least one computer-readable medium of claim 7, wherein updating the location of record includes generating a new hardware asset record in a database.

11. The at least one computer-readable medium of claim 7, wherein the operations further comprise:
    updating at least one other parameter based on the set of parameters characterizing the at least one hardware asset,
        wherein the at least one other parameter includes an asset version, an OSS, an asset health, a battery life, a scheduled maintenance time, an asset configuration, or an asset type.

12. The at least one computer-readable medium of claim 7, wherein at least a portion of the operations are performed in real time in response to the triggering event.

13. The at least one computer-readable medium of claim 7, wherein the asset history associated with the at least one hardware asset is discarded after a predefined time interval since decommissioning the at least one hardware asset.

14. The at least one computer-readable medium of claim 7, wherein the received search query associated with the at least one hardware asset includes a set of search parameters comprising a serial number, a site identifier, an OSS associated with the at least one hardware asset, or a combination thereof.

15. At least one computer-readable medium, excluding transitory signals, carrying instructions that, when executed by a computing system, cause the computing system to perform operations to update a location parameter for a telecommunications hardware asset, the operations comprising:
    detecting a triggering event to update parameter values associated with a set of telecommunications hardware assets;
    using attributes of the triggering event, selecting a subset of telecommunications hardware assets from the set telecommunications hardware assets,
        wherein the subset of telecommunications hardware assets includes a first telecommunications hardware asset and a second telecommunications hardware asset; and
    for each telecommunications hardware asset in the subset of telecommunications hardware assets:
        accessing a first telecommunications hardware asset object associated with the first telecommunications hardware asset from a first operations support system (OSS);
        accessing a second telecommunications hardware asset object associated with the second telecommunications hardware asset object from a second OSS;
        determining, using the accessed at least one telecommunications hardware asset object, a current value of a location parameter of the telecommunications hardware asset;
        determining a value of record of the location parameter of the telecommunications hardware asset; and
        when the value of record of the location parameter does not match the current value of the location parameter of the telecommunications hardware asset, updating the value of record to be the current value of the location parameter.

16. The at least one computer-readable medium of claim 15, wherein the triggering event includes receiving a search query associated with the at least one telecommunications hardware asset, and wherein at least a portion of the operations are performed in real time in response to the triggering event.

17. The at least one computer-readable medium of claim 15, wherein the triggering event includes a scheduled database update, and wherein the current value of the location parameter of at least one telecommunications hardware asset in the subset of telecommunications hardware assets corresponds to a cell site or base station.

18. The at least one computer-readable medium of claim 15, wherein determining the value of record includes accessing a telecommunications hardware asset record in a database, and wherein updating the value of record includes generating a new telecommunications hardware asset record.

19. The at least one computer-readable medium of claim 15, wherein the operations further comprise:
   before updating the value of record, storing the value of record in an asset history for the telecommunications hardware asset.

20. The at least one computer-readable medium of claim 15, wherein the operations further comprise:
   updating at least one other value of record for a telecommunications hardware asset in the subset of telecommunications hardware asset based on a telecommunications hardware asset object,
      wherein the at least one other value of record is associated with an asset version, an OSS, an asset health, a battery life, a scheduled maintenance time, an asset configuration, or an asset type.

* * * * *